(12) United States Patent
Zhang et al.

(10) Patent No.: US 7,876,317 B2
(45) Date of Patent: Jan. 25, 2011

(54) APPARATUS AND METHOD OF PRODUCING 3D STRUCTURAL SKETCH AND COMPUTER-READABLE RECORDING MEDIUM ON WHICH COMPUTE PROGRAM FOR EXECUTING THE METHOD IS RECORDED

(75) Inventors: Hui Zhang, Yongin-si (KR); Seokyoon Jung, Seoul (KR); Shinjun Lee, Seoul (KR); Duckhoon Kim, Seoul (KR); Ildong Yun, Seongnam-si (KR); Sangwook Lee, Seoul (KR); Sehyuk Yun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 509 days.

(21) Appl. No.: 11/230,652

(22) Filed: Sep. 21, 2005

(65) Prior Publication Data
US 2006/0143221 A1    Jun. 29, 2006

(30) Foreign Application Priority Data
Dec. 13, 2004  (KR) ...................... 10-2004-0104916

(51) Int. Cl.
G06T 15/00   (2006.01)
G06T 17/00   (2006.01)

(52) U.S. Cl. ..................... 345/419; 345/420
(58) Field of Classification Search ................. 345/419, 345/420, 440
See application file for complete search history.

(56) References Cited

U.S. PATENT DOCUMENTS 5,511,158 A * 4/1996 Sims .......................... 345/440
5,734,384 A * 3/1998 Yanof et al. ................. 345/424
5,893,095 A * 4/1999 Jain et al. ....................... 707/6

(Continued)

FOREIGN PATENT DOCUMENTS

EP          1429264 A2 * 6/2004
KR     10-2004-0049261    6/2004

OTHER PUBLICATIONS

Rosin, P.L.; "Shape partitioning by convexity", IEEE Transactions on Systems, Man and Cybernetics, Part A, vol. 30, Issue 2, Mar. 2000, pp. 202-210.*

Ming-Yi Ju; et al., "A novel collision detection method based on enclosed ellipsoid", Proceedings 2001 ICRA IEEE International Conference on Robotics and Automation, 2001, vol. 3, pp. 2897-2902.*

(Continued)

*Primary Examiner*—Ulka Chauhan
*Assistant Examiner*—Roberta Prendergast
(74) *Attorney, Agent, or Firm*—Staas & Halsey LLP (57) ABSTRACT

An apparatus and method of producing a three-dimensional structural sketch (3DSS) and a computer-readable recording medium on which a computer program for executing the method is recorded are provided. The apparatus includes a property-detecting unit detecting a unary property of each part of a predetermined two-dimensional sketch and relational properties of the parts; a node-generating unit receiving the detected unary properties and the parts and converting the parts into nodes having three-dimensional shapes together with the detected unary properties; and a node-arranging unit receiving the detected relational properties and the nodes, arranging the nodes according to the detected relational properties, and generating a three-dimensional structural sketch, wherein the unary property includes geometric property and the relational property include topologic property. Thus, the apparatus can easily produce a 3DSS and update the produced 3DSS.

26 Claims, 10 Drawing Sheets

U.S. PATENT DOCUMENTS

| | | | | | |
|---|---|---|---|---|---|
| 5,911,139 | A | * | 6/1999 | Jain et al. | 707/3 |
| 5,913,205 | A | * | 6/1999 | Jain et al. | 707/2 |
| 5,915,250 | A | * | 6/1999 | Jain et al. | 707/100 |
| 6,141,019 | A | * | 10/2000 | Roseborough et al. | 345/473 |
| 6,219,059 | B1 | * | 4/2001 | Argiro | 345/424 |
| 6,240,424 | B1 | * | 5/2001 | Hirata | 707/104.1 |
| 6,323,863 | B1 | * | 11/2001 | Shinagawa et al. | 345/441 |
| 6,933,941 | B1 | * | 8/2005 | Peercy et al. | 345/428 |
| 7,057,618 | B2 | * | 6/2006 | Russ et al. | 345/473 |
| 7,171,060 | B2 | * | 1/2007 | Park et al. | 382/305 |
| 7,239,929 | B2 | * | 7/2007 | Ulrich et al. | 700/98 |
| 2004/0150640 | A1 | * | 8/2004 | Park et al. | 345/419 |
| 2004/0249809 | A1 | * | 12/2004 | Ramani et al. | 707/4 |

OTHER PUBLICATIONS

Biasotti, S., "Reeb graph representation of surfaces with boundary", Proceedings Shape Modeling Applications 2004, Jun. 7-9, 2004, pp. 371-374.*

Bober, M.; "MPEG-7 visual shape descriptors", IEEE Transactions on Circuits and Systems for Video Technology, vol. 11, Issue 6, Jun. 2001, pp. 716-719.*

Funkhouser, et al., "Shape-based retrieval and analysis of 3D models", ACM SIGGRAPH 2004 Course Notes, Aug. 8-12, 2004, SIGGRAPH '04, ACM Press, NY, NY, 136 pages.*

Hilaga, et al., 2001, "Topology matching for fully automatic similarity estimation of 3D shapes", Proceedings of the 28th Annual Conference on Computer Graphics and interactive Techniques, SIGGRAPH '01, ACM Press, NY, NY, pp. 203-212.*

Sundar, H.; Silver, D.; Gagvani, N.; Dickinson, S.; "Skeleton based shape matching and retrieval", In Shape Modeling International 2003, SMI '03, May 12-15, 2003, pp. 130-139.*

Tangelder, J.W.H.; Veltkamp, R.C., "A survey of content based 3D shape retrieval methods", Proceedings Shape Modeling Applications 2004, Jun. 7-9, 2004, pp. 145-156.*

Zaharia et al., "3D Shape/Core Experiment: Semantic Versus Geometric Categorization of 3D Mesh Models", International Organisation for Standardisation, ISO/IEC JTC1/SC29NVG11, Coding of Structures and Audio, MPEG001M6104, 2000, pp. 1-10, Geneva, Switzerland.*

Kyung-Ah Sohn et al., "Computing distances between surfaces using line geometry", Proceedings 10th Pacific Conference on Computer Graphics and Applications, Oct. 9-11, 2002, pp. 236-245.*

Sheng-Po Shiang et al., "Estimate of minimum distance between convex polyhedra based on enclosed ellipsoids", Proceedings IEEE/RSJ International Conference on Intelligent Robots and Systems, 2000. (IROS 2000). vol. 1, Oct. 31-Nov. 5, 2000, pp. 739-744.*

Zunic, J.; Rosin, P.L.; "A new convexity measure for polygons", IEEE Transactions on Pattern Analysis and Machine Intelligence, vol. 26, Issue 7, Jul. 2004, pp. 923-934.*

Attali, D., et al., "Computing and Simplifying 2D and 3D Continuous Skeletons", Computer Vision and Image Understanding, vol. 67(No. 3), Article No. IV970536, 1997, pp. 261-273.*

Bardinet, E., et al., "Structural Object Matching", Technical Report DECSAI- 000303, Department of Computer Science and AI, University of Granada, (2000), 9pgs.*

Bischoff, S.; Kobbelt, L.; "Ellipsoid decomposition of 3D-models", Proceedings First International Symposium on 3D Data Processing Visualization and Transmission, Jun. 19-21, 2002, pages.*

Blinn, James, "Nested Transformations and Blobby Man", IEEE Computer Graphics and Applications, vol. 7, Issue 10, Oct. 1987, pp. 59-65.*

Corney, J.; Rea, H.; Clark, D.; Pritchard, J.; Breaks, M.; Macleod, R.; "Coarse filters for shape matching", IEEE Computer Graphics and Applications, vol. 22, Issue 3, May-Jun. 2002, pp. 65-74.*

El-Mehalawi, M., et al., "A Database System of Mechanical Components Based in Geometric and Topological Similarity. Part I: Representation", Computer Aided Design 35, (2003), pp. 83-94.*

Foggia, P., Genna, R., Vento, M., 2000, "Prototype learning with attributed relational graphs", Proceedings of the Eighth Joint IAPR International Workshop SSPR 2000, Jan. 2000, pp. 447-456.*

Duck Hoon Kim et al., "Shape Decomposition Scheme By Combining Mathematical Morphology and Convex Partitioning", The 5th Asian Conference on Computer Vision, ACCV2002, Jan. 2002, pp. 1-6, Melbourne, Australia.*

Duck Hoon Kim; II Dong Yun; Sang Uk Lee, "Interactive 3-D Shape Retrieval System Using the Attributed Relational Graph," Conference on Computer Vision and Pattern Recognition Workshop, 2004, CVPRW '04, Jun. 2-27, 2004, 8 pages.*

Kim DH, Park IK, Yun ID, Lee SU (2004) A New MPEG-7 Standard: Perceptual 3-D Shape Descriptor, Lecture Notes in Computer Science, vol. 3332/2004, Oct. 2004, pp. 238-245.*

Patrick Min, John A. Halderman, Michael Kazhdan, and Thomas A. Funkhouser, "Early Experiences with a 3D Model Search Engine," Web3D Symposium, pp. 7-18, Saint Malo, France, Mar. 2003.*

In Kyu Park et al., "Perceptual 3D Shape Descriptor: Result of Core Experiment", International Organisation for Standardisation, ISO/IEC JTC1/SC29/WG11, Coding of Moving Pictures and Audio, MPEG2003/M10093, Oct. 2003, 9 pages, Brisbane, Australia.*

In-Kyu Park et al., "Perceptual 3D Shape Descriptor: Result of Core Experiment", International Organisation for Standardisation, ISO/IEC JTC1/SC29/WG11, Coding of Moving Pictures and audio, MPEG2003/M9809, Jul. 2003, 9 pages, Trondheim, Norway.*

Takahashi, S., Shinagawa, Y., and Kunii, T. L. 1997. A feature-based approach for smooth surfaces. In Proceedings of the Fourth ACM Symposium on Solid Modeling and Applications (Atlanta, Georgia, United States, May 14 -16, 1997). SMA '97. ACM, New York, NY, 97-110.*

Titus Zaharia et al., "3D Shape/Core Experiment: Semantic Versus Geometric Categorization of 3D Mesh Models", International Organisation for Standardisation, ISO/IEC JTC1/SC29/WG11, Coding of Moving Pictures and Audio, MPEG00/M6104, Jun. 2000, logs. 1-10, Geneva, Switzerland.*

Min, Patrick, "A 3D model search engine", PhD thesis, Princeton University, Jan. 2004, pp. 1-139.*

Gagvani N, Silver D, (May 1999) "Parameter controlled volume thinning", Graph Models Image Process, vol. 61(3):149-164.*

Srihari, S. N. 1981. Representation of Three-Dimensional Digital Images. ACM Comput. Surv. 13, 4 (Dec. 1981), 399-424.*

A.W. Fitzgibbon, et al., "A Buyer's Guide to Conic Fitting", Proceedings of the $6^{th}$ British Conference on Machine Vision, 1995, pp. 513-522.

Korean Office Action issued Feb. 7, 2006, in Patent Application No. 10-2004-0104916.

* cited by examiner

APPARATUS AND METHOD OF PRODUCING 3D STRUCTURAL SKETCH AND COMPUTER-READABLE RECORDING MEDIUM ON WHICH COMPUTE PROGRAM FOR EXECUTING THE METHOD IS RECORDED

CROSS-REFERENCE TO RELATED APPLICATIONS

This application claims the benefit of Korean Application No. 10-2004-0104916, filed Dec. 13, 2004, in the Korean Intellectual Property Office, the disclosure of which is incorporated herein by reference.

BACKGROUND OF THE INVENTION

1. Field of the Invention

The present invention relates to producing a three-dimensional (3D) structural sketch (3DSS), and more specifically, to an apparatus and method of producing a 3DSS, which make it easy to produce a 3DSS from a two-dimensional structural sketch and update the produced 3DSS, and a computer-readable recording medium on which a computer program for executing the method is recorded.

2. Description of the Related Art

The development of a three-dimensional (3D) graphics technology and the expansion of the scope of related industries have increased the need for producing 3D graphics contents more quickly and precisely.

Figure 1:
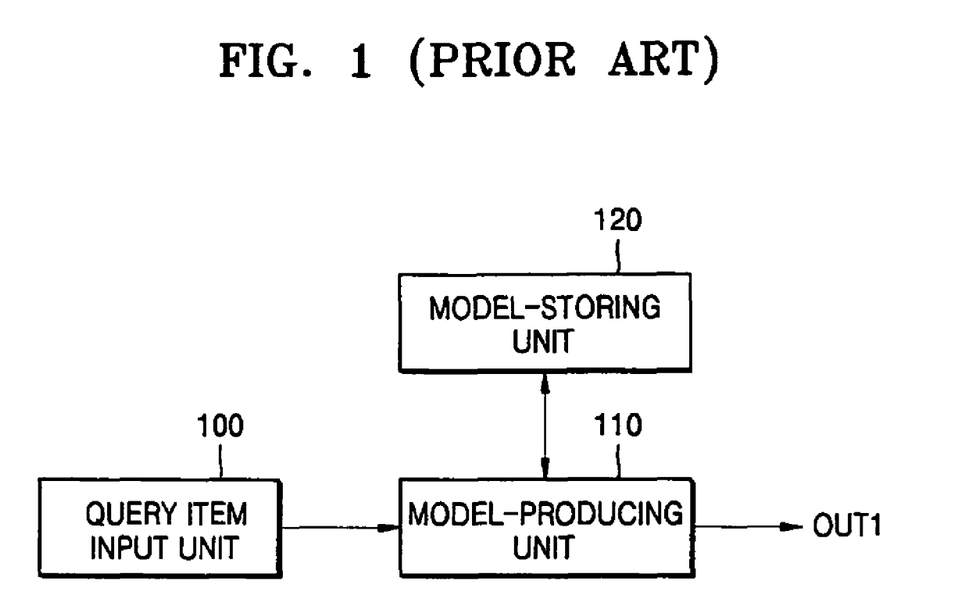
FIG. 1 is a block diagram of a conventional apparatus for producing three-dimensional (3D) graphics contents.
Figure 2:
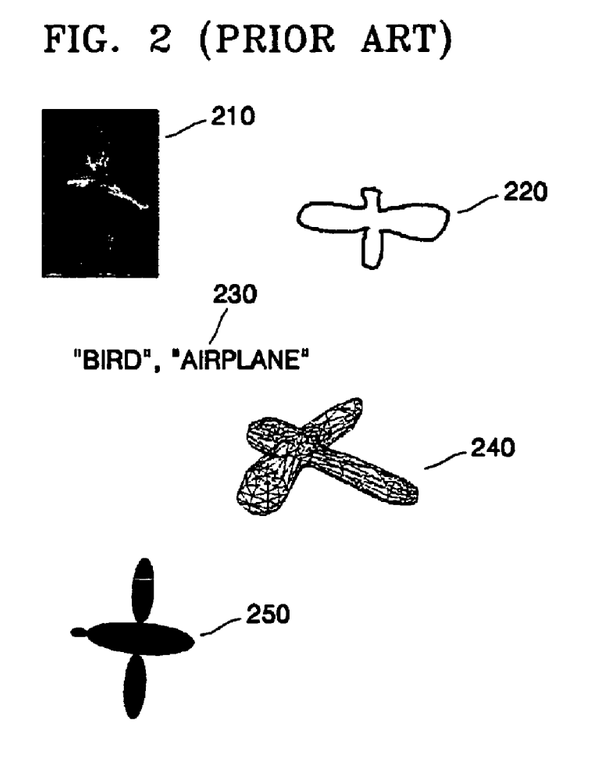
FIG. 2 illustrates examples of query items.
Figure 3:
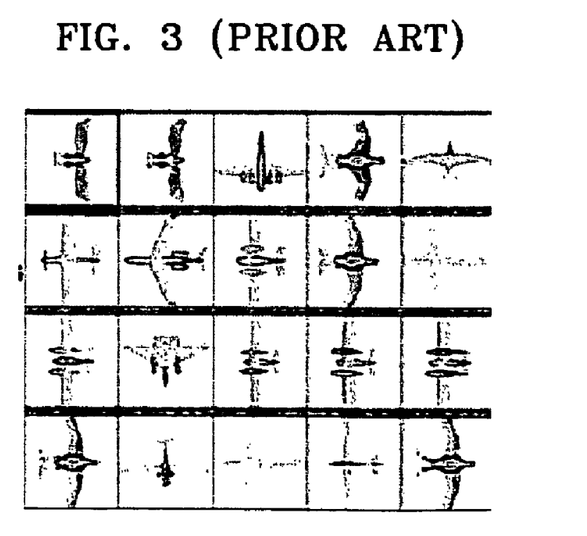
FIG. 3 illustrates examples of models retrieved by the conventional apparatus of FIG. 1 after receiving a query item illustrated in FIG. 2.

FIG. 1 is a block diagram of a conventional apparatus for producing 3D graphics contents. FIG. 2 illustrates examples of query items. FIG. 3 illustrates examples of models retrieved by the conventional apparatus of FIG. 1 after receiving a query item illustrated in FIG. 2.

Referring to FIGS. 1 through 3, the conventional apparatus for producing 3D graphics contents includes a query item input unit 100, a model-producing unit 110, and a model-storing unit 120. OUT1 indicates 3D graphics contents produced by the model-producing unit 110.

The query item input unit 100 receives a query item and transmits the query item to the model-producing unit 110. A query item, i.e., a query object, denotes predetermined graphics contents that a user desires to produce.

The model-storing unit 120 stores a plurality of 3D-shape models that can match a predetermined query item. From the 3D-shape models stored in the model-storing unit 120, the model-producing unit 110 retrieves and outputs one or more 3D-shape models within a predetermined degree of similarity with the predetermined query item.

Query items that can be input to the query item input unit 100 include a sketch query, a text query, and a sample query. More specifically, the sketch query may include a two-dimensional (2D) contour sketch, a 3D-shape sketch, and a 2D structural sketch. The sample query may include a 2D image sample and a 3D shape sample. Reference numerals 210, 220, 230, 240, and 250 indicate a sample query, a 2D-contour sketch, a text query, a 3D-shape sketch, and a 2D-structural sketch, respectively. All of the query items illustrated in FIG. 2 indicate a bird or an airplane. Accordingly, the model-producing unit 110 produces a plurality of bird models or a plurality of airplane models as illustrated in FIG. 3.

The query items that can be used by the conventional apparatus for producing 3D graphics contents have the following problems. For example, the text query 230 can be easily produced. However, when the text query 230 is used as a query item, graphics contents, which are hard to express in words, cannot be exactly expressed. Also, the same graphics contents can be expressed differently according to people. It is not easy to produce the sketch query 220, 240 or 250, and the sample query 210 may be unavailable as a query item.

Figure 4:
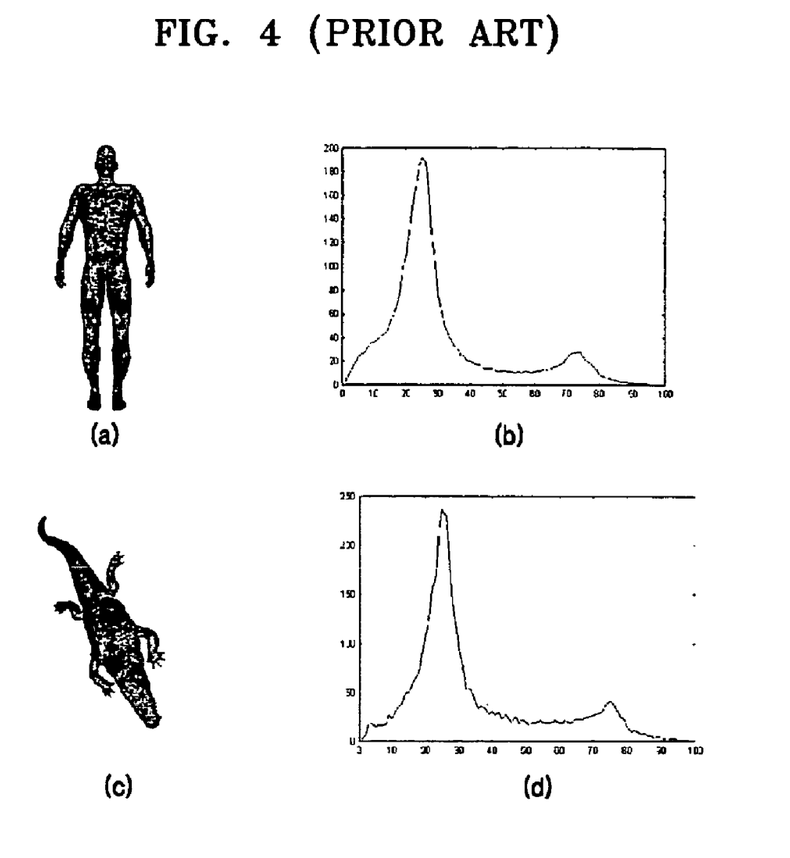
FIG. 4 (parts (a), (b), (c), and (d)) is an example for illustrating limitations of a Shape3D in distinguishing shapes.

FIG. 4 is an example for illustrating limitations of a Shape3D in distinguishing shapes. More specifically, (a) of FIG. 4 indicates an "android" model and (b) of FIG. 4 indicates a shape spectrum of the "android" model described by the Shape3D. (c) and (d) of FIG. 4 indicates a shape and a shape spectrum of a "crocodile" model described by the Shape 3D.

The Shape3D is a description method of 3D shapes, which was suggested by a conventional Moving Picture Experts Group-7 (MPEG-7) and adopted as an international standard for searching the model-storing unit 120. However, the performance of the Shape3D to distinguish shapes is poor. Referring to (a) through (d) of FIG. 4, the "adroid" model and the "crocodile" model illustrated in (a) and (c) of FIG. 4 are obviously different but their shape spectrums illustrated in (b) and (d) of FIG. 4 are very similar. Consequently, the Shape3D cannot produce a proper query item.

SUMMARY OF THE INVENTION

Additional aspects, features and/or advantages of the invention will be set forth in part in the description which follows and, in part, will be apparent from the description, or may be learned by practice of the invention.

The present invention provides an apparatus for producing a three-dimensional Structural Sketch (3DSS), which can easily produce a 3DSS from a two-dimensional sketch and makes it easy for a user to instruct to update the produced 3DSS.

The present invention also provides a method of producing a 3DSS, which makes it easy to produce a 3DSS from a two-dimensional sketch and enables a user to easily instruct to update the produced 3DSS.

The present invention also provides a computer-readable recording medium on which a computer program for executing a method of producing a 3DSS, which makes it easy to produce a 3DSS from a two-dimensional sketch and enables a user to easily instruct to update the produced 3DSS, is recorded.

According to an aspect of the present invention, there is provided an apparatus for producing a three-dimensional structural sketch. The apparatus includes: a property-detecting unit detecting a unary property of each part of a predetermined two-dimensional sketch and relational properties of the parts; a node-generating unit receiving the detected unary properties and the parts and converting the parts into nodes having three-dimensional shapes together with the detected unary properties; and a node-arranging unit receiving the detected relational properties and the nodes, arranging the nodes according to the detected relational properties, and generating a three-dimensional structural sketch, wherein the unary property includes geometric property such ad convexity property and the relational property include topologic property.

The apparatus further includes a user sketch input unit generating a predetermined two-dimensional sketch drawn and providing the two-dimensional sketch to the property-detecting unit and the node-generating node, wherein the property-detecting unit may detect the unary property of each part of the generated two-dimensional sketch and the relational properties between the parts.

The apparatus further includes a model database storing a plurality of models that can match the three-dimensional structural sketch and shape descriptors of the models; and a model-retrieving unit receiving the three-dimensional structural sketch, comparing a shape descriptor extracted from the three-dimensional structural sketch with shape descriptors of the models stored in the model database, and outputting one or more models having shape descriptors with a predetermined degree of similarity with the extracted shape descriptor, wherein the shape descriptor may be a language that expresses a shape based on a set of properties including geometric and topologic properties.

The apparatus may further include a three-dimensional structural sketch-updating unit receiving the three-dimensional structural sketch, changing at least one of the shapes of the nodes of the three-dimensional structural sketch and topology of the nodes on the three-dimensional structural sketch according to instructions of the user, and generating an updated three-dimensional structural sketch.

According to another aspect of the present invention, there is provided a method of producing a three-dimensional structural sketch. The method includes: detecting a unary property of each part of a given two-dimensional sketch and relational properties between the parts; receiving the detected unary properties and the parts and converting the parts into nodes having three-dimensional shapes together with the detected unary properties; and receiving the detected relational properties and the nodes, arranging the nodes according to the detected relational properties, and generating a three-dimensional structural sketch, wherein the unary property includes geometric property and the relational property includes topologic property.

According to another aspect of the present invention, there is provided a computer-readable recording medium on which a computer program for executing a method of producing a three-dimensional structural sketch is recorded, the method including: detecting a unary property of each part of a given two-dimensional sketch and relational properties between the parts; receiving the detected unary properties and the parts and converting the parts into nodes having three-dimensional shapes together with the detected unary properties; and receiving the detected relational properties and the nodes, arranging the nodes according to the detected relational properties, and generating a three-dimensional structural sketch, wherein the unary property includes geometric property and the relational property includes topologic property.

According to another aspect of the present invention, there is provided a method of producing a three-dimensional structural sketch, the method comprising: detecting a unary property of each part of a given two-dimensional sketch and relational properties between the parts; converting the parts into nodes having three-dimensional shapes together with the detected unary properties; arranging the nodes according to the detected relational properties; and generating the three-dimensional structural sketch, wherein each unary property includes geometric property and each relational property includes topologic property.

According to another aspect of the present invention, there is provided at least one computer-readable recording medium storing instructions that control at least one processor to perform a method of producing a three-dimensional structural sketch, the method comprising: detecting a unary property of each part of a given two-dimensional sketch and relational properties between the parts; converting the parts into nodes having three-dimensional shapes together with the detected unary properties; arranging the nodes according to the detected relational properties; and generating the three-dimensional structural sketch, wherein each unary property includes geometric property and each relational property includes topologic property.

BRIEF DESCRIPTION OF THE DRAWINGS

These and/or other aspects, features, and advantages of the invention will become apparent and more readily appreciated from the following description of the embodiments, taken in conjunction with the accompanying drawings of which.

DETAILED DESCRIPTION OF THE PREFERRED EMBODIMENTS

The present invention will now be described more fully with reference to the accompanying drawings, in which exemplary embodiments of the invention are shown and in which like reference numerals refer to like elements throughout. The invention may, however, be embodied in many different forms and should not be construed as being limited to the exemplary embodiments set forth therein; rather, these exemplary embodiments are provided so that this disclosure will be thorough and complete, and will fully convey the concept of the invention to those skilled in the art.

Terms used herein are defined in consideration of functions of elements expressed by the terms. The definitions of the terms may be changed according to intentions or customs of their users. Therefore, the terms shall be defined based on the contents of the entire specification.

Figure 5:
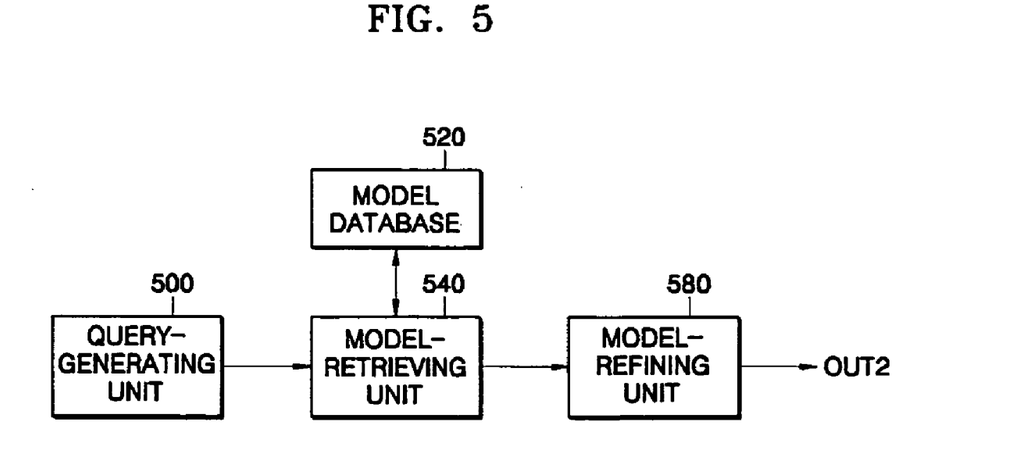
FIGS. 5 and 6 are block diagrams of apparatuses for producing graphics contents using an apparatus for producing a 3D-structural sketch (3DSS) according to an exemplary embodiment of the present invention.
Figure 6:
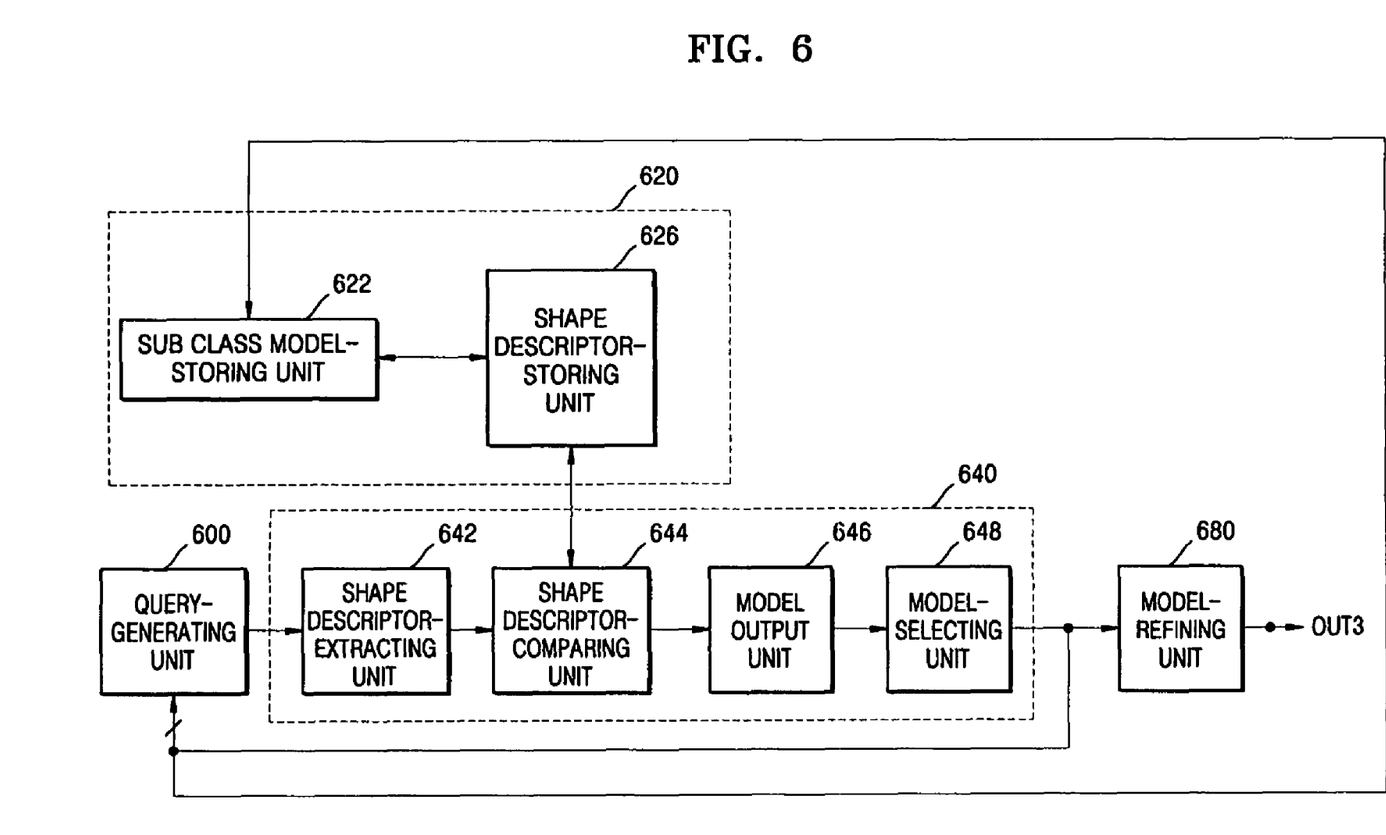

FIGS. 5 and 6 are block diagrams of apparatuses for producing graphics contents using, as a query item, a three-dimensional structural sketch (3DSS) produced by an apparatus for producing a 3DSS according to an exemplary embodiment of the present invention. Each of the apparatuses for producing graphics contents includes a query-generating unit 500 or 600, a model database 520 or 620, a model-retrieving unit 540 or 640, and a model-refining unit 580 or 680.

OUT2 and OUT3 indicate graphics contents output by the model-refining unit 580 and 680, respectively, and OUT2 is identical to OUT3. The operations of the query-generating unit 500, the model database 520, the model-retrieving unit 540, and the model-refining unit 580 illustrated in FIG. 5 are identical to those of the query-generating unit 600, the model database 620, the model-retrieving unit 640, and the model-refining unit 680 illustrated in FIG. 6. Hence, only FIG. 6 will be described.

The query-generating unit 600 generates a query composed of one or more query items. A query item, i.e., a query object, denotes graphics contents that a user desires to produce. The graphics contents that the user desires to produce may be three-dimensional.

A query item may be expressed in various formats, and a query composed of one or more query items is input to the model-retrieving unit 620. Examples of query items in various formats include a sketch query, a text query, and a sample query. Of the query items in various formats, an exemplary embodiment of the present apparatus suggests a 3DSS, which will be described later with reference to FIGS. 7 through 15.

A query may be composed of only one query item or a plurality of query items. When a query composed of a plurality of query items is input to the model-retrieving unit 640, the query is called a multimodal query.

The model database 620 stores a plurality of models, which can match a predetermined query item, and shape descriptors of the models. The model database 620 may store the models and their shape descriptors in advance.

The models stored in the model database 620 may be two-dimensional or three-dimensional. However, 3D models are preferred.

A shape descriptor is a language that expresses a shape with a set of its properties including geometric and topologic properties. Therefore, all models stored in the model database 620 and query items having shapes generated by the query-generating unit 600 have shape descriptors.

If two models have different shape descriptors, the two models are different from each other. If the two models have partly identical shape descriptors, they share some properties. If the shape descriptors of the two models match exactly, the models share all of their properties. Ultimately, a shape descriptor is the key to a model or a query item.

The model database 620 includes a shape model-storing unit 622 and a shape descriptor-storing unit 626. The shape model-storing unit 622 stores shape models. Each model can be expressed by a shape descriptor and shape descriptors of all models stored in the model database 620 are stored in the shape descriptor-storing unit 626.

The model-retrieving unit 640 receives a query, compares a shape descriptor extracted from the received query with shape descriptors of the models stored in the model database 620, and outputs one or more models whose shape descriptors are within a predetermined degree of similarity with that of the query.

The model-retrieving unit 640 includes a shape descriptor-extracting unit 642, a shape descriptor-comparing unit 644, a model output unit 646, and a model-selecting unit 648.

The shape descriptor-extracting unit 642 receives a query and extracts a shape descriptor from the received query. The shape descriptor-comparing unit 644 compares shape descriptors of models stored in the shape descriptor-storing unit 626 with the shape descriptor extracted by the shape descriptor extracting-unit 642. Based on the comparison, the shape descriptor-comparing unit 644 determines one or more shape descriptors within a predetermined degree of similarity with the shape descriptor extracted by the shape descriptor-extracting unit 642. The shape descriptor-comparing unit 644 need not necessarily compare all of the models stored in the model database 620 with the received query.

The model output unit 646 outputs one or more models within a predetermined degree of similarity with the received query based on the result of comparison made by the shape descriptor-comparing unit 644. The model output unit 646 outputs only one model when the shape descriptor-storing unit 626 stores a shape descriptor that exactly matches the extracted shape descriptor. However, such a case is rare.

For example, if a query generated by the query-generating unit 600 is composed of query items indicating an "airplane," the model output unit 646 included in the model-retrieving unit 640 outputs one or more models having shape descriptors within a predetermined degree of similarity with the shape descriptor of the received query. The model output unit 646 may output "airplane" models or "bird" models, or output various types of "airplane" models.

The models output from the model output unit 646 may be a plurality of "airplane" models and a plurality of "bird" models since shape descriptors of the "airplane" and "bird" models may be similar. Therefore, the model-selecting unit 648 is needed.

The model-selecting unit 648 may select one of the models output from the model output unit 646 through a user. However, if the model output unit 646 outputs only one model, the model-selecting unit 648 may not be needed. Preferably, the number of models retrieved and output by the model-retrieving unit 640 may be only one. Only one model which is output by the model output unit 646, or only one model which is selected by the model-selecting unit 648.

The 3D-structural sketch (3DSS), which is suggested as a query item used by the query-generating unit 600 to generate a query in an exemplary embodiment of the present invention, will now be described.

An apparatus and method of producing a 3DSS and a computer-readable recording medium on which a program for executing the method is recorded will be described with reference to FIGS. 7 through 11. An apparatus and method of updating the produced 3DSS will be described with reference to FIGS. 13 through 15.

A query item from which a perceptibly recognizable 3D shape descriptor (hereinafter, called P3DS shape descriptor) is extracted is called a 3DSS. In other words, a 3DSS visually represents a P3DS shape descriptor in three-dimensional space.

Figure 15A:
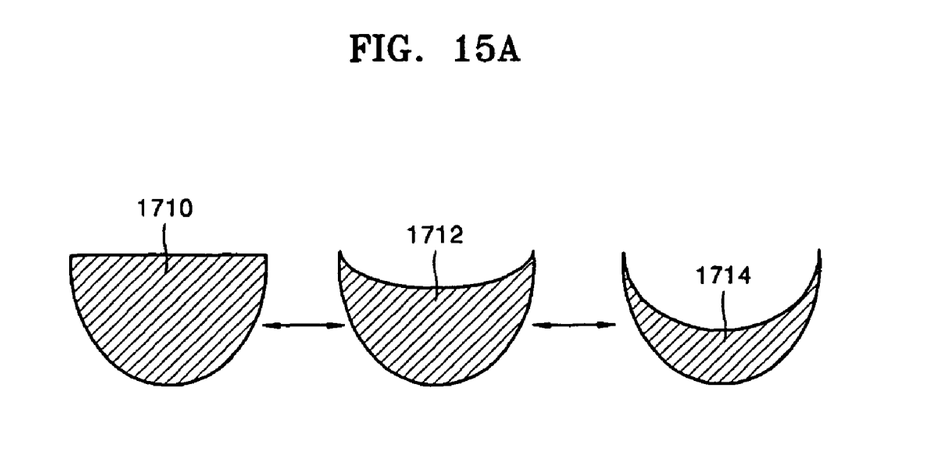
FIGS. 15A and 15B illustrate examples of the visualization and user editing of convexity property of a node, in two-dimensional and three-dimensional styles.
Figure 15B:
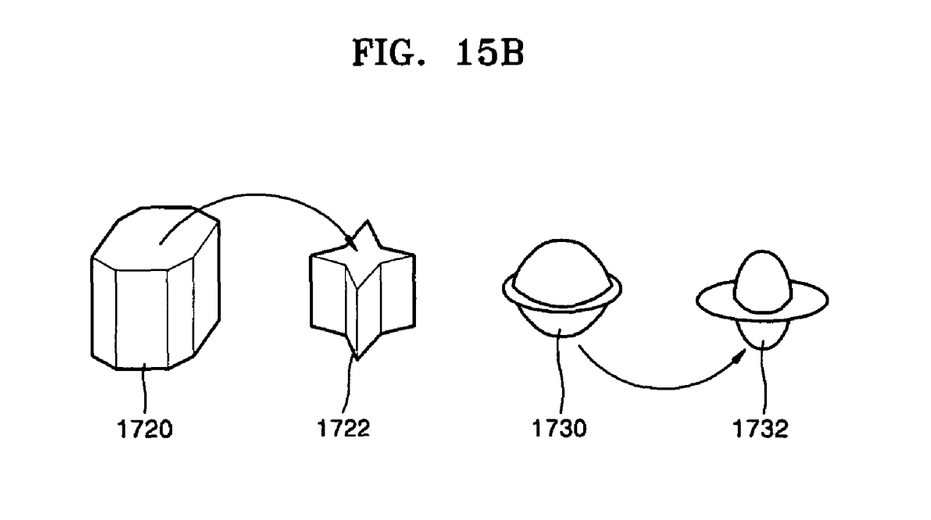

The P3DS shape descriptor and the 3DSS will be described with reference to FIGS. 7 through 15. To this end, it is assumed that shape descriptors of all models stored in the model database 620 and shape descriptors of all query items are P3DS shape descriptors.

The P3DS shape descriptor is a shape descriptor which represents a 3D object as an attribute relational graph composed of a node and an edge, which is a part-based representation of the 3D object. A 3DSS visually represents a P3DS shape descriptor in three-dimensional space, using nodes and edges. Specifically, the 3DSS may represent the nodes as ellipsoids together with convexity property and the edges as links between the ellipsoids.

The apparatus (hereinafter, called the present apparatus according to an exemplary embodiment of the present invention) and method (hereinafter, called the present method according to an exemplary embodiment of the present invention) of producing a 3DSS will now be described in earnest with reference to FIGS. 9 through 15.

Figure 7:
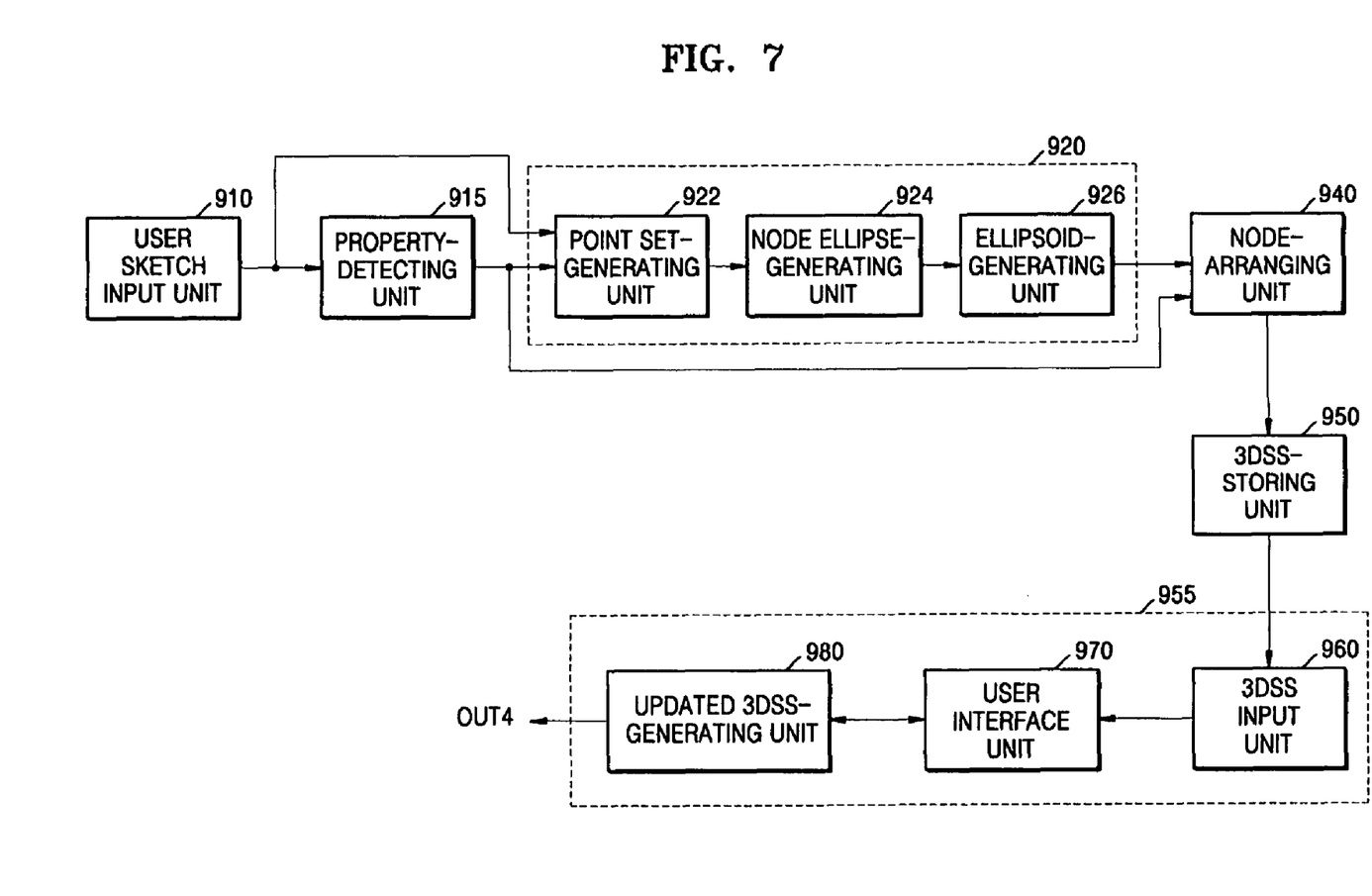
FIG. 7 is a block diagram of an apparatus for producing a 3DSS according to an exemplary embodiment of the present invention.

FIG. 7 is a block diagram of the present apparatus according to an exemplary embodiment of the present invention. The present apparatus according to an exemplary embodiment of the present invention includes a user sketch input unit 910, a property-detecting unit 915, a node-generating unit 920, a node-arranging unit 940, a 3DSS-storing unit 950, and a 3DSS-updating unit 955.

The node-generating unit 920 includes a point set-generating unit 922, a node ellipse-generating unit 924, and an ellipsoid-generating unit 926. The 3DSS-updating unit 955 includes a 3DSS input unit 960, a user interface unit 970, and an updated 3DSS-generating unit 980.

The present apparatus according to an exemplary embodiment of the present invention shown in FIG. 7 may not include at least one of the 3DSS-storing unit 950 and the 3DSS-updating unit 955. OUT4 indicates an "updated 3DSS" output from the updated 3DSS-generating unit 980.

The user sketch input unit 910 may receive a predetermined 2D sketch and provide the predetermined 2D sketch to the property-detecting unit 915 and the node-generating unit 920. In other words, the user sketch input unit 910 may receive a 2D sketch from an external source and pass the received 2D sketch to the property-detecting unit 915 and the node-generating unit 920 or produce a 2D sketch and provide the produced 2D sketch to the property-detecting unit 915 and the node-generating unit 920.

When the user sketch input unit 910 transmits 2D sketches received from the external source to the property-detecting unit 915 and the node-generating unit 920, the user sketch input unit 910 may transmit one 2D sketch each time or simultaneously transmit a predetermined number of 2D sketches consecutively received from the external source. A 2D sketch denotes a sketched 2D model. The 2D sketch may be composed of 2D-closed curves or links between nodes.

The property-detecting unit 915 detects a unary property of each part of a 2D sketch or relational properties of the parts. A unary property includes geometric property such as convexity property, and the relational properties include topologic properties. For example, the relational properties show at what angle two parts constituting a 2D sketch are connected. The convexity property can be calculated by dividing a Sin, which is an area of the sketch of a 2D closed curve, by a Sconv, which is an area of the convex hull of the 2D closed curve. And the topologic properties can be obtained according to the links between nodes.

The node-generating unit 920 receives the detected unary property detected by the property-detecting unit 915 and each part of the 2D sketch and converts each part of the 2D sketch into a node having a 3D shape together with the detected unary property. The node may have an ellipsoid shape.

To convert each part of the 2D sketch into a node having the 3D shape together with the detected unary property, the node-generating unit 920 may include the point set-generating unit 922, the node ellipse-generating unit 924, and the ellipsoid-generating unit 926. The point set-generating unit 922 receives each part of the 2D sketch and converts each part of the 2D sketch into a point set together with the detected unary property.

In other words, the node-generating unit 920 generates a set of points constituting each part of the 2D sketch. The set of points generated by the point set-generating unit 922 is called a point set. For example, if a 2D sketch of a puppy is input, the point set-generating unit 922 generates a point set for each head, body, and leg part of the 2D sketch of the puppy However, the present apparatus according to an exemplary embodiment of the present invention shown in FIG. 7 may not include the point set-generating unit 922. In this case, the node ellipse-generating unit 924 receives the 2D sketch of one part and the unary property detected by the property-detecting unit 915, and converts it into an elliptical shape together with the unary property.

When the node-generating unit 920 includes the point set-generating unit 922, the node ellipse-generating unit 922 fits a point set generated by the point set-generating unit 922 to an ellipse. A detailed description of such ellipse fitting is available at "A Buyer's Guide to Conic Fitting," pp. 513-514, $2^{nd}$ edition, September 1995, by A. W. Fitzgibbon and R. B. Fisher, which is incorporated by reference.

Since the point set-generating unit 922 generates a point set together with the unary property detected by the property-detecting unit 915, the node ellipse-generating unit 924 fits the point set to a node ellipse having the elliptical shape together with the unary property detected by the property-detecting unit 915.

The ellipsoid-generating unit 926 included in the node-generating unit 920 inflates the node ellipse generated by the node ellipse-generating unit 924 and generates an ellipsoid. The length of an axis of the ellipsoid in a direction in which the node ellipse is inflated to generate the ellipsoid may be equal to the length of a shorter axis of two axes of the node ellipse. The same rule can be applied to all node ellipses to be inflated.

As described above, a node may be an ellipsoid, and the node-generating unit 920 includes the node ellipse-generating unit 924 and the ellipsoid-generating unit 926 to generate a node having an ellipsoid shape together with the unary property detected by property-detecting unit 915.

The node-generating unit 920 generates nodes based on each part of the 2D sketch. For example, in the case of the 2D sketch of the puppy, the node-generating unit 920 may express the head and the body parts of the puppy as a node indicating the head part (hereinafter, called "head node") and a node indicating the body part of the puppy (hereinafter, called "body part"). Since the head part is smaller than the body part, if the node-generating unit 920 generates nodes having the elliptical shapes, the head node must be smaller than the body node.

The node-arranging unit 940 receives the relational properties and the nodes, arranges the nodes according to the detected relational properties, and generates a 3DSS. When the node-arranging unit 940 arranges the nodes according to the relational properties, some of the nodes become connected to another.

For example, in the sketch of the puppy described above, the head node and the body node are connected to each other. In this case, the head node and the body node must be connected according to various properties including topologic properties of the head part and the body part. Therefore, if the neck of the puppy is expressed short in the sketch of the puppy, an overlapping part of the head and body nodes must be large. Also, the topology of the head node with respect to the body node must be different according to whether the puppy lowers or lifts its head, based on topologic property of each of the body node and the head node.

Figure 10:
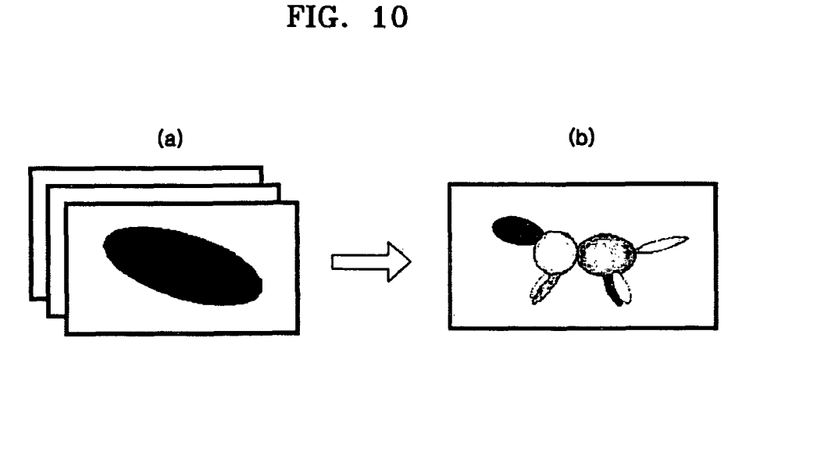
FIG. 10 (parts (a) and (b)) illustrates an example of a schematic 3DSS.

FIG. 10 illustrates an example of a schematic 3DSS. (a) of FIG. 10 shows a node generated for each part of the sketch of the puppy, and (b) of FIG. 10 shows a 3DSS of the puppy generated by arranging the nodes illustrated in (a) of FIG. 10 according to relational properties of each of the nodes.

Figure 11:
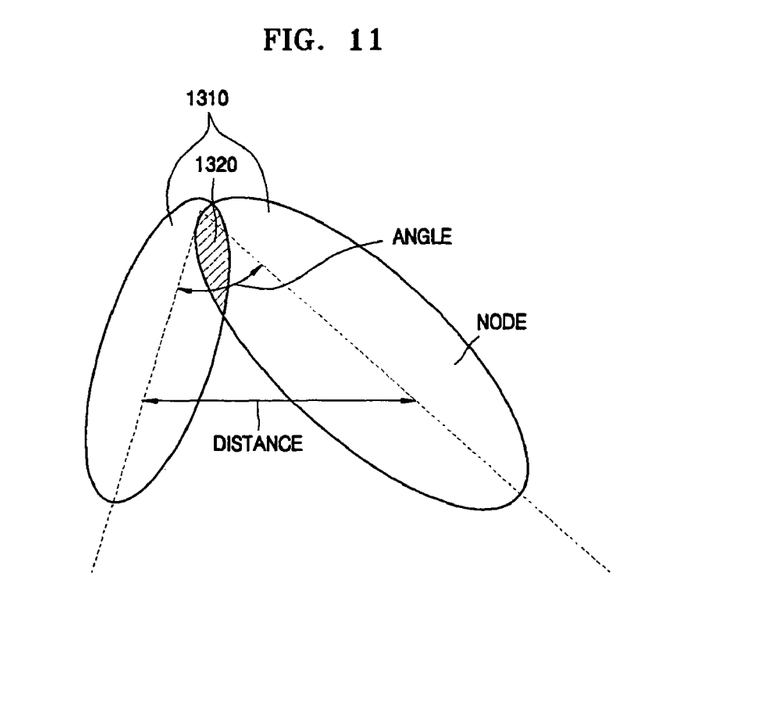
FIG. 11 is a view for illustrating examples of edges constituting a 3DSS.

A portion where the nodes are connected to each other, i.e., an overlapping portion, are called an edge. FIG. 11 is a view for illustrating edges constituting a 3DSS. In FIG. 11, two nodes 1310 are connected to each other at a predetermined angle according to predetermined topologic properties. Here, a portion 1320 where the two nodes 1310 are connected to each other is called an edge.

The node-arranging unit 940 appropriately arranges the nodes generated by the node-generating unit 920 together with the convexity property detected by the property-detecting unit and outputs a complete 3DSS. The 3DSS may be input to the query-generating unit 600 or the model-retrieving unit 640 included in the apparatus for producing graphics contents. In the first case, the 3DSS is input to the query-generating unit 600 as a query item used by the query-generating unit 600 to generate a query. While in the second case, the 3DSS is input to the model-retrieving unit 640 as a query.

Figure 8:
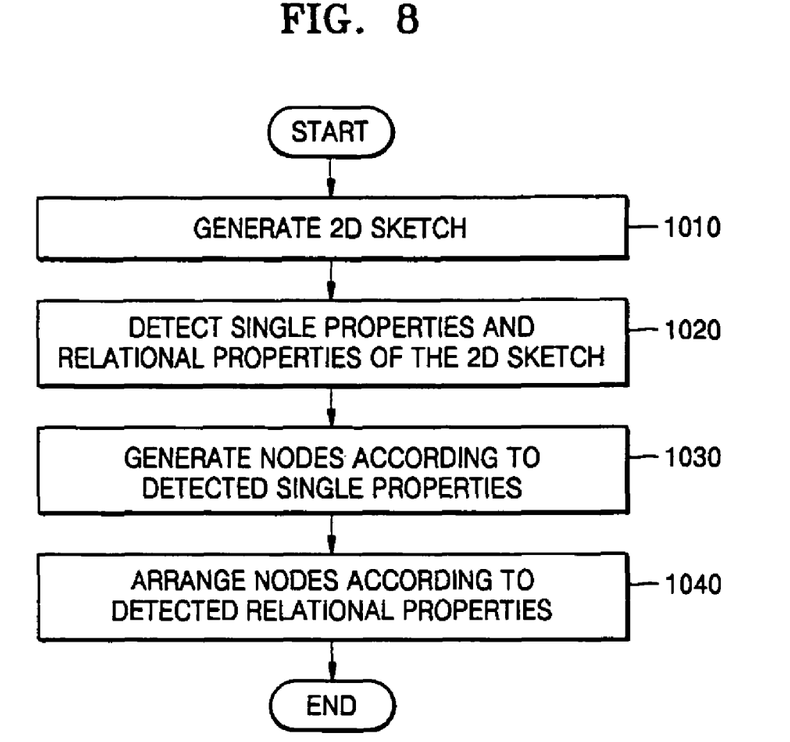
FIG. 8 is a flowchart illustrating a method of producing a 3DSS according to an exemplary embodiment of the present invention.

FIG. 8 is a flowchart illustrating the present method according to an exemplary embodiment of the present invention. The present method according to an exemplary embodiment of the present invention includes receiving a 2D sketch (operation 1010), detecting a unary property and relational properties (operation 1020), generating nodes (operation 1030), and arranging the nodes (operation 1040).

The user sketch input unit 910 receives a 2D sketch drawn by a user (operation 1010). The property-detecting unit 915 detects a unary property of each part of the 2D sketch and relational properties of the parts (operation 1020).

The node-generating unit 920 generates predetermined 3D-shape nodes together with the detected unary property (operation 1030). The node-arranging unit 940 arranges the predetermined 3D-shape nodes generated by the node-generating unit 920 according to the relational properties and completes a predetermined 3DSS (operation 1040).

Figure 9:
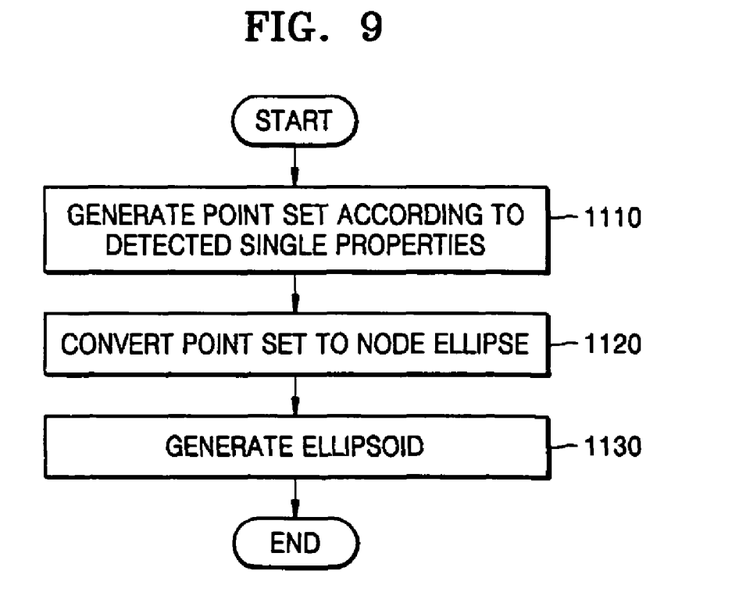
FIG. 9 is a flowchart illustrating examples of operations 1010 and 1020 of FIG. 8.

FIG. 9 is a flowchart illustrating operation 1030 of FIG. 8. Operation 1030 includes generating a point set (operation 1110), generating a node ellipse (operation 1120), and generating an ellipsoid (operation 1130).

The point set-generating unit 922 converts each part of a 2D sketch into a point set together with a unary property of each part of the 2D sketch (operation 1110). The node ellipse-generating unit 924 converts the point set into a node ellipse (operation 1120), and the ellipsoid-generating unit 926 inflates the node ellipse and generates an ellipsoid (operation 1140). In this case, a node may have an ellipsoid shape defined by three orthogonal axial lengths and the detected convexity property.

A 3DSS output from the node-arranging unit 940 may be stored in the 3DSS-storing unit 950. However, the present apparatus according to an exemplary embodiment of the present invention shown in FIG. 7 may not include the 3DSS-storing unit 950.

The 3DSS input unit 960, the user interface unit 970, and the updated 3DSS-generating unit 980, which will be described later, are blocks for updating the 3DSS output from the node-arranging unit 940 according to an instruction from the user.

The 3DSS input unit 960 receives the 3DSS output from the node-arranging unit 940. The user interface unit 970 displays the 3DSS output from the 3DSS input unit 960 and an updated 3DSS generated by the updated 3DSS-generating unit 980. To this end, the user interface unit 970 provides a user with an interface where the user can instruct to at least one of the shape and topology of a node.

The updated 3DSS-generating unit 980 receives a predetermined instruction from the user through the user interface unit 970, changes at least one of the shape of the node of the 3DSS output from the 3DSS input unit 960 and the topology of the node in the 3DSS, and generates the updated 3DSS.

Here, some or all of the nodes of the 3DSS output from the node-arranging unit 940 may be changed.

Figure 12:
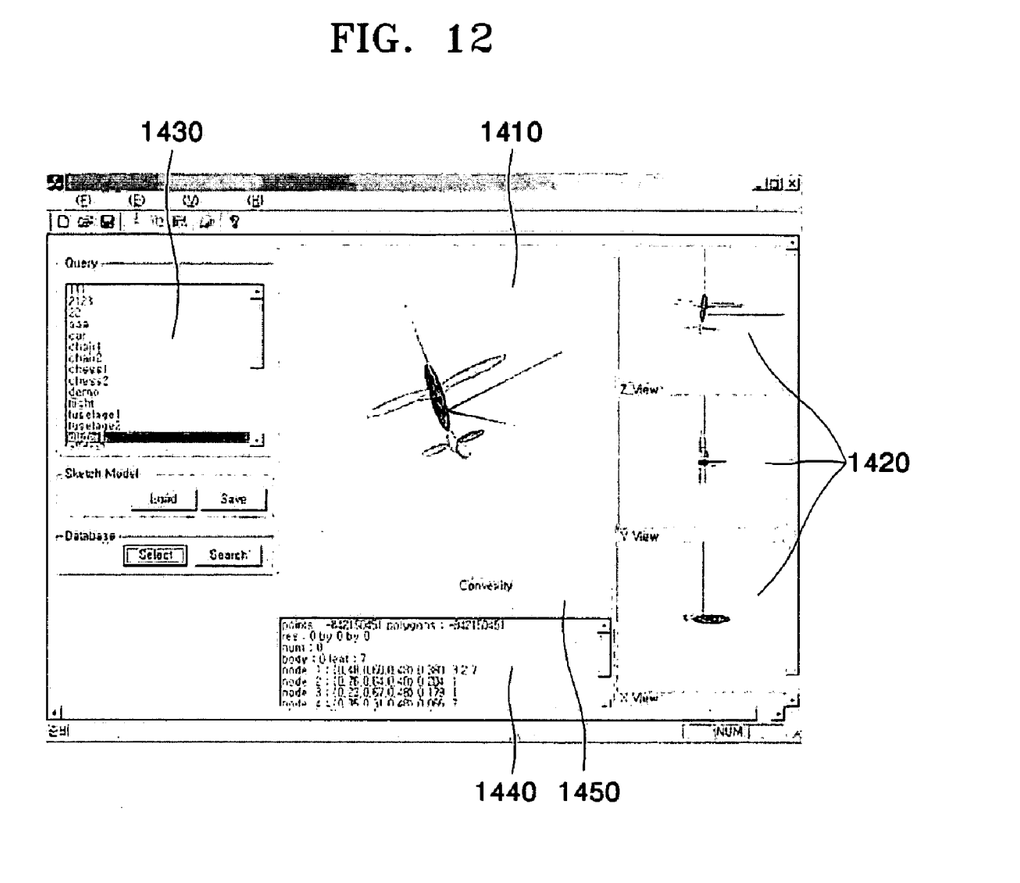
FIG. 12 shows a user interface unit illustrated in FIG. 7 according to an exemplary embodiment of the present invention.

FIG. 12 shows the user interface unit 970 illustrated in FIG. 7 according to an exemplary embodiment of the present invention. The user interface unit 970 includes a 3D main job window 1410, three sub job windows 1420, a query select window 1430, a property display window 1440, and a convexity display window 1450. A combination of the main job window 1410 and the sub job windows 1420 can be called an update job window.

The main job window 1410 receives and reflects an update instruction directly from a user and displays the result of reflection in three dimensions. The sub job windows 1420 display the result of reflection displayed on the main job window 1410 in the perspective of one axis. So, the sub job windows 1420 display the result of reflection in two dimensions. In other words, an updated 3D query item displayed on the main job window 1410 is displayed along X, Y and Z axes on the three sub job windows 1420 in real time.

The query select window 1430 is where the user can select a query item to be updated. To this end, the 3DSS generated by the node-arranging unit 940 is stored in the 3DSS-storing unit 950.

The property display window 1440 displays unary properties of all nodes of the displayed 3DSS on the main job window 1410 and relational properties of an edge between connected nodes. The convexity display window 1450 displays the convexity property of a node selected by the user on he main job window 1410. The visualization of convexity property will be described later.

The updated 3DSS-generating unit 980 updates the 3DSS output from the 3DSS input unit 960 according to the update instruction from the user received through the user interface unit 970. In this way, the 3DSS is updated.

The 3DSS may be updated by rotating or moving a node, dividing two connected nodes, or connecting divided nodes. Alternatively, if nodes have ellipsoid shapes, the 3DSS may be updated by changing a convexity value of a node or an axial length of a node. In this case, the convexity of a node can be visualized as 2-D or 3-D shapes whose concave degree can change gradually. FIGS. 15A and 15B show 2-D and 3-D shapes respectively. The user can edit the convexity value by proceeding smoothly from 1710 to 1714, through 1712, for a gradually decreased convexity value. The same process for 3-D style visualization is shown from 1720 to 1722, and from 1730 to 1732. In this way, the 3DSS can be updated by changing such convexity.

Figure 13:
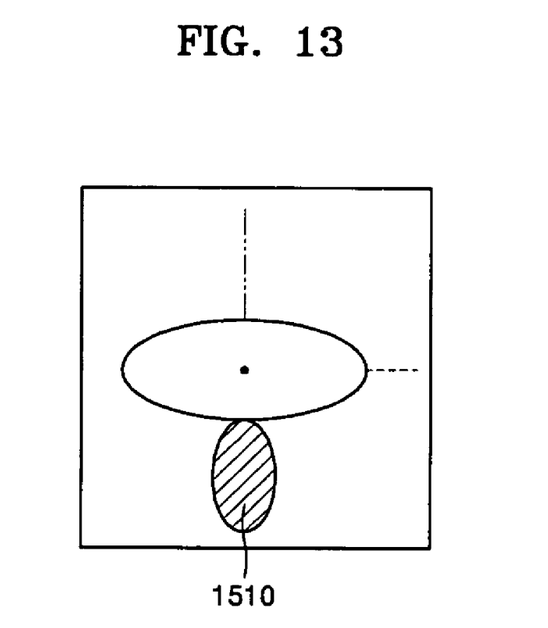
FIGS. 13 and 14 (parts (a), (b), (c), and (d)) are exemplary views displayed on a displaying window included in the user interface unit of FIG. 12 after a node constituting a 3DSS is displaced.
Figure 14:
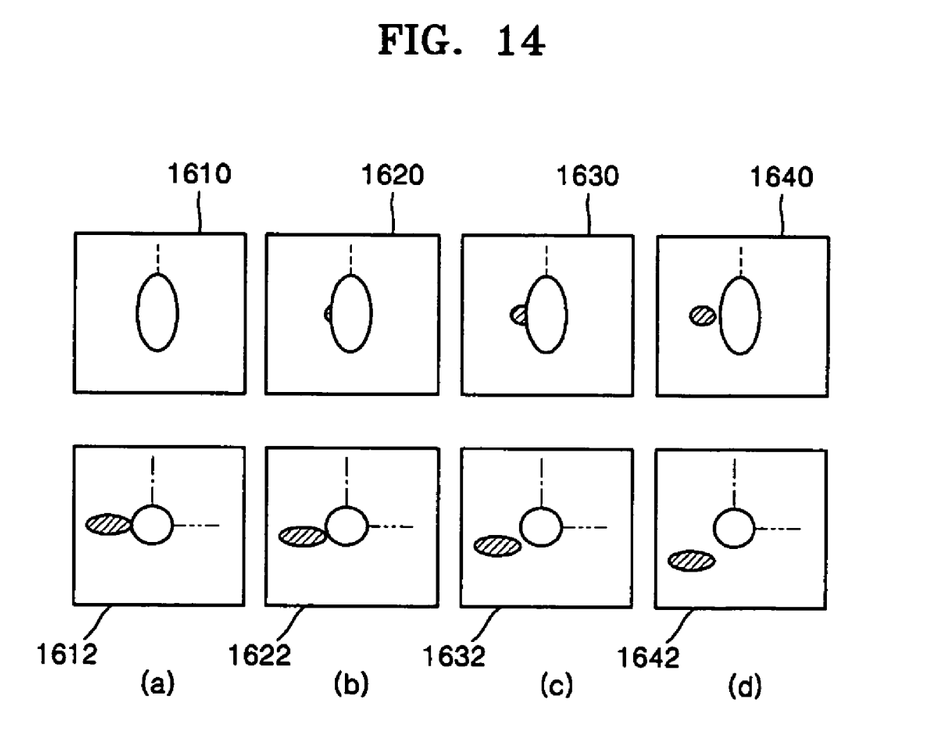

FIGS. 13 and 14 are views displayed on a main job window or a sub job window included in the user interface unit 970 of FIG. 12 after a node 1510 constituting a 3DSS is displaced. FIG. 13 is an example of a 3DSS displayed on the main job window 1410. It is assumed that a direction indicated by a dashed line is an X-axis direction, a direction indicated by a chain double-dashed line is a Y-axis direction, a vertical direction in the drawing is a Z-axis direction, and each axis is orthogonal. Based on this assumption, the 3DSS illustrated in FIG. 13 was observed along the Z-axis direction.

FIG. 14 illustrates various examples of a 3DSS displayed on the sub job windows 1420. The X-axis direction is indicated by a dashed line in top row. Each of (a) through (d) of FIG. 14 shows the result of displacing the node 1510, which is an oblique-lined ellipse, a predetermined distance along the Z-axis direction and then observing the 3DSS illustrated in FIG. 13 from the perspective of the Y axis 1610, 1620, 1630, or 1640 and the X axis 1612, 1622, 1632, or 1642. The distance moved by the node 1510, i.e., the oblique-lined ellipse, in the Z-axis direction becomes longer from (a) toward (d) of FIG. 14.

Since the main job window 1420 and the sub job windows 1410 are displayed on one screen, it is not necessary for a user to bring up an additional three-dimensional viewing window having a different observation axis direction to view the 3DSS after displacing the node 1510, i.e., the oblique-lined ellipse.

In addition to the above described exemplary embodiments, exemplary embodiments of the present invention can also be implemented by executing computer readable code/instructions in/on a medium, e.g., a computer readable medium. The medium can correspond to any medium/media permitting the storing and/or transmission of the computer readable code.

The computer readable code/instructions can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The medium may also be a distributed network, so that the computer readable code/instructions is stored/transferred and executed in a distributed fashion. The computer readable code/instructions may be executed by one or more processors.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A method of producing a three-dimensional structural sketch of an object having two-dimensional body parts, the method comprising:
   detecting, using a computer, a unary property of each part of a given two-dimensional sketch and relational properties between the two-dimensional body parts;
   receiving the detected unary properties and the two-dimensional body parts, converting the two-dimensional body parts into body part node ellipses having visual elliptical shapes together with the detected unary properties, and converting all of the body part node ellipses into three dimensional body part nodes having three-dimensional visual shapes by inflating the body part node ellipses according to the detected unary property respective to each two-dimensional body part; and
   receiving the detected relational properties and the nodes, connecting the three-dimensional body part node ellipses to each other according to the detected relational properties, and generating a three-dimensional structural sketch depicting the given two-dimensional sketch in three dimensions,
   wherein the unary property includes geometric property and the relational property includes topologic property, and
   wherein the three-dimensional structural sketch is built entirely of three-dimensional body part ellipses from the two-dimensional sketch.

2. The method of claim 1, wherein the using a computer to perform further comprises generating a two-dimensional sketch according to an instruction of a user, wherein the detecting of the unary properties and the relational properties comprises:
   calculating the area of the sketch of a 2D closed curve as Sin;
   calculating the area of the convex hull of the 2D closed curve as Sconv;
   dividing Sin by Sconv to obtain unary convexity property; and
   obtaining relational properties according to the links between nodes.

3. The method of claim 1, wherein the receiving of the detected unary properties and the parts and converting of the parts into the nodes further comprises:
   receiving the detected unary properties and the parts and converting the parts into point sets together with the detected unary properties, and in the converting of the parts into the node ellipses, the point sets are converted into the node ellipses having elliptical shapes together with the detected unary properties, and each of the point sets is a set of predetermined points constituting each part of the two-dimensional sketch.

4. The method of claim 1, wherein the using a computer to perform further comprises receiving the generated three-dimensional structural sketch and retrieving one or more models that have shape descriptors with a predetermined degree of similarity with a shape descriptor extracted from the three-dimensional structural sketch among a plurality of prepared models that can match a three-dimensional structural sketch respectively, wherein the shape descriptor is a language that expresses a shape based on a set of properties including geometric and topologic properties.

5. The method of claim 4, wherein the using a computer to perform further comprises refining the one or more retrieved models according to an instruction from the user and generating a user-intended model.

6. The method of claim 1, wherein the using a computer to perform further comprises receiving the generated three-dimensional structural sketch and changing at least one of the shapes of the nodes of the generated three-dimensional structural sketch and topology of the generated nodes on the three-dimensional structural sketch according to instructions of the user.

7. An apparatus for producing a three-dimensional structural sketch of an object having two-dimensional body parts, comprising:
   a computer comprising:
      a property-detecting unit to detect a unary property of each two dimensional body part of a predetermined two-dimensional sketch of the object and relational properties of the two-dimensional body parts;
      a node-generating unit to receive the detected unary properties and the two dimensional body parts, to convert the two dimensional body parts into body part node ellipses having visual elliptical shapes together with the detected unary properties, and to convert all of the body part node ellipses into three dimensional body part nodes having three-dimensional visual shapes by inflating the body part node ellipses according to the detected unary property corresponding to each two-dimensional body part; and
      a node-arranging unit to receive the detected relational properties and the nodes, to connect the three-dimensional body part node ellipses to each other according to the detected relational properties, and to generate a three-dimensional structural sketch depicting the predetermined two-dimensional sketch in three dimensions; and
   an interface unit displaying the three dimensional structural sketch including the three-dimensional visual shapes, wherein the unary property includes geometric property and the relational property include topologic property, and wherein the three-dimensional structural sketch is built entirely of three-dimensional body part ellipses from the two-dimensional sketch and displayed.

8. The apparatus of claim 7, further comprising a user sketch input unit to generate a predetermined two-dimensional sketch drawn and to provide the two-dimensional sketch to the property-detecting unit and the node-generating unit, wherein the property-detecting unit detects the unary property of each part of the generated two-dimensional sketch and the relational properties between the parts.

9. The apparatus of claim 7, wherein the two-dimensional sketch is composed of two-dimensional closed curves or links between nodes.

10. The apparatus of claim 7, wherein the nodes have predetermined ellipsoid shapes together with convexity property.

11. The apparatus of claim 7, wherein the property-detecting unit comprises:
a convexity property detecting unit to detect the convexity property from two-dimensional close curve; and
a relational property detecting unit to obtain the relational property from links between nodes.

12. The apparatus of claim 7, wherein the node-generating unit further comprises a point set-generating unit to receive the detected unary properties and the parts and to convert the parts into point sets together with the detected unary properties, the node ellipse-generating unit converts the point sets into the node ellipses having elliptical shapes together with the detected unary properties, and each of the point sets is a set of predetermined points constituting each part of the two-dimensional sketch.

13. The apparatus of claim 7, further comprising:
a model database to store a plurality of models that can match the three-dimensional structural sketch and shape descriptors of the models; and
a model-retrieving unit to receive the three-dimensional structural sketch, to compare a shape descriptor extracted from the three-dimensional structural sketch with shape descriptors of the models stored in the model database, and to output one or more models having shape descriptors with a predetermined degree of similarity with the extracted shape descriptor,
wherein the shape descriptor is a language that expresses a shape based on a set of properties including geometric and topologic properties.

14. The apparatus of claim 13, further comprising a mode-refining unit to refine the one or more retrieved models according to an instruction from the user and generating a user-intended model.

15. The apparatus of claim 1, further comprising a three-dimensional structural sketch-updating unit to receive the three-dimensional structural sketch, to change at least one of the shapes of the nodes of the three-dimensional structural sketch and topology of the nodes on the three-dimensional structural sketch according to instructions of the user, and to generate an updated three-dimensional structural sketch.

16. The apparatus of claim 15, wherein the three-dimensional structural sketch-updating unit further comprises a user interface unit to display the received three-dimensional structural sketch and the updated three-dimensional structural sketch and to provide the user with an interface where the user can instruct the three-dimensional structural sketch-updating unit to change the at least one of the shapes and the topology of the nodes.

17. The apparatus of claim 16, wherein the user interface unit includes a three dimensional main job window, at least one sub job window, a query select window, a property select window, and a convexity display window.

18. The apparatus of claim 15, wherein the change made by the three-dimensional structural sketch-updating unit includes rotating or moving the nodes.

19. The apparatus of claim 15, wherein the change made by the three-dimensional structural sketch-updating unit includes dividing the nodes connected to one another.

20. The apparatus of claim 15, wherein the change made by the three-dimensional structural sketch-updating unit includes connecting the divided nodes.

21. The apparatus of claim 15, wherein the nodes have ellipsoid shapes, and the change made by the three-dimensional structural sketch-updating unit includes changing convexity values of the nodes.

22. The apparatus of claim 15, wherein the nodes have the ellipsoid shapes and the change involves changing a length of an axis of each of the nodes.

23. The apparatus of claim 7, wherein the three-dimensional structural sketch forms one query item for a query having a plurality of query items.

24. The apparatus of claim 23, wherein the plurality of query items forming the query includes the three-dimensional structural sketch and at least one of a text query item and a sample query item.

25. At least one computer-readable magnetic storage media or optical recording media storing instructions that control at least one processor to perform a method of producing a three-dimensional structural sketch of an object having two-dimensional body parts, the method comprising:
detecting a unary property of each part of a given two-dimensional sketch and relational properties between the two-dimensional body parts;
receiving the detected unary properties and the two-dimensional body parts, converting the two-dimensional body parts into body part node ellipses having visual elliptical shapes together with the detected unary properties, and converting all of the body part node ellipses into three-dimensional body part nodes having three-dimensional visual shapes by inflating the node ellipses according to the detected unary property respective to each part; and
receiving the detected relational properties and the nodes, connecting the three-dimensional body part node ellipses to each other according to the detected relational properties, and generating a three-dimensional structural sketch depicting the given two-dimensional sketch in three dimensions,
wherein the unary property includes geometric property and the relational property includes topologic property, and
wherein the three-dimensional structural sketch is built entirely of three-dimensional body part ellipses from the two-dimensional sketch and displayed.

26. The magnetic storage media or optical recording media storage of claim 25, wherein the method further comprises receiving the generated three-dimensional structural sketch and retrieving one or more models that have shape descriptors with a predetermined degree of similarity with a shape descriptor extracted from the received three-dimensional structural sketch among a plurality of prepared models that can match a three-dimensional structural sketch respectively, wherein the shape descriptor is a language that expresses a shape based on a set of properties including geometric and topologic properties.

* * * * *

UNITED STATES PATENT AND TRADEMARK OFFICE
CERTIFICATE OF CORRECTION

| | | |
|---|---|---|
| PATENT NO. | : 7,876,317 B2 | Page 1 of 1 |
| APPLICATION NO. | : 11/230652 | |
| DATED | : January 25, 2011 | |
| INVENTOR(S) | : Hui Zhang et al. | |

It is certified that error appears in the above-identified patent and that said Letters Patent is hereby corrected as shown below:

Title Page, Column 1 (Title), Line 4, delete "COMPUTE" and insert --COMPUTER--, therefor.

Column 1 (Title), Line 4, delete "COMPUTE" and insert --COMPUTER--, therefor.

Column 12, Line 9, In Claim 3, delete "comprises;" and insert --comprises:--, therefor.

Column 13, Line 53, In Claim 15, delete "claim 1," and insert --claim 7,--, therefor.

Signed and Sealed this
Twenty-sixth Day of April, 2011

David J. Kappos
*Director of the United States Patent and Trademark Office*